United States Patent Office 3,814,588
Patented June 4, 1974

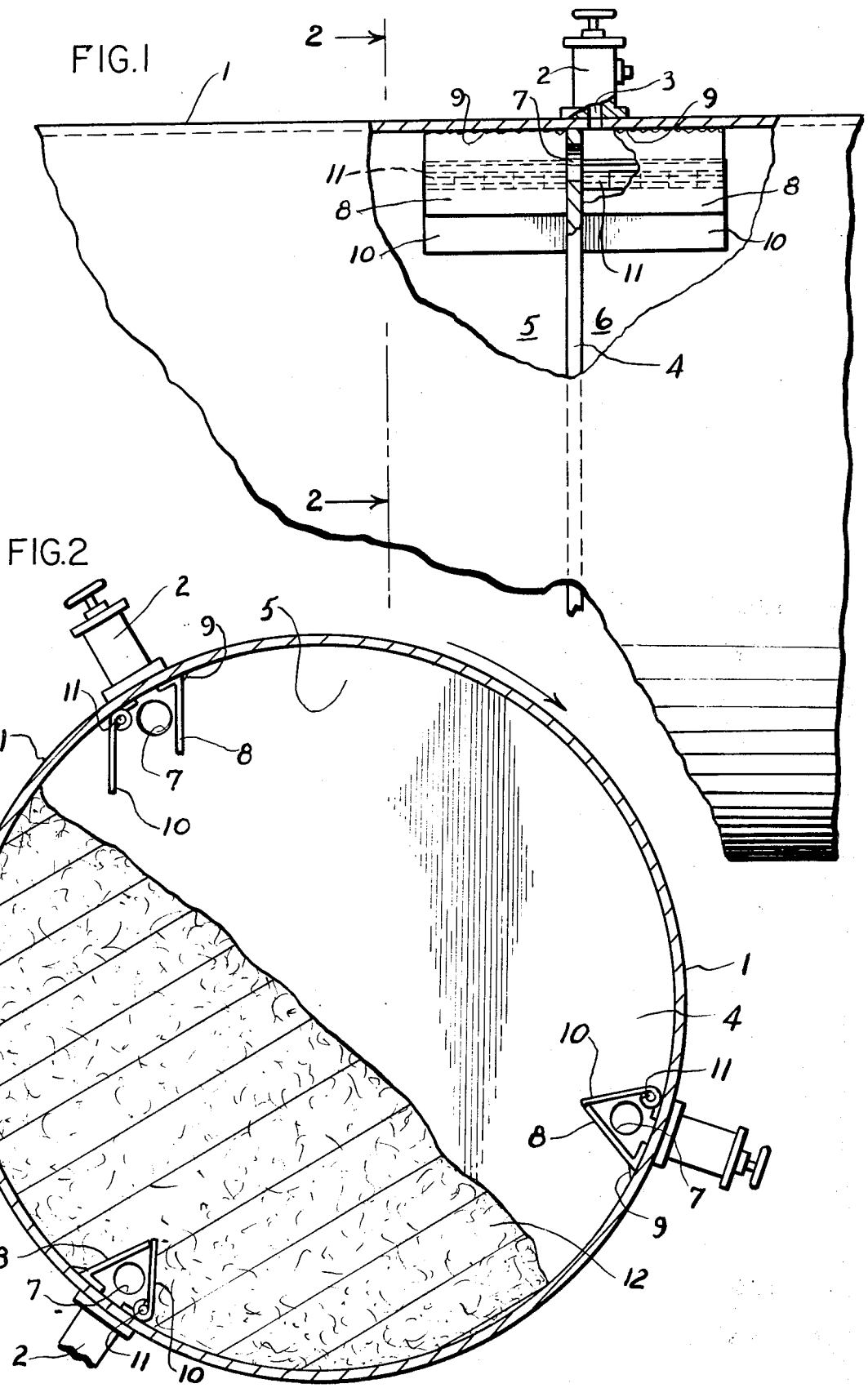

3,814,588
APPARATUS FOR MAKING ORGANIC FERTILIZER
Eric W. Eweson, 465 Park Ave., New York, N.Y. 10022, and Anthony Frazer Eweson, Many Skies, Silverton, British Columbia, Canada
Filed May 10, 1972, Ser. No. 252,324
Int. Cl. C05f 9/02
U.S. Cl. 23—259.1                                 3 Claims

ABSTRACT OF THE DISCLOSURE

A device for protecting air passages and valves is provided for use in rotary digesters for the aerobic decomposition of waste organic material. One type of such digester is divided into a series of compartments by partitions. Passages for the flow of air and generated gases are provided in the partitions and valve controlled passages are provided to vent the compartments to the outside. These passages are protected by a cover structure which includes a hinged baffle which is closed when the passages are buried in the material during rotation of the digester and which open when the passages emerge from the material.

---

This invention relates to apparatus for making organic fertilizer, sometimes referred to as compost, from organic waste material such as municipal garbage, sewage sludge, meat packing wastes, canning factory wastes and the like.

In prior Pats. Nos. 3,138,447 and 3,245,759 in which Eric W. Eweson, co-inventor herein, is the inventor, methods and apparatus for the manufacture of such organic fertilizers from such organic waste materials are described. The methods therein described are all designed to produce an efficient and thorough aerobic decomposition of such waste organic materials by maintaining, within the apparatus in which the method is carried out, conditions suitable for optimum propagation of the aerobic bacteria on which such decomposition depends. One of the principal requisites for the maintenance of such conditions is the provision of a proper supply of air and for the circulation of air throughout the apparatus, and the provision of suitable means for venting the apparatus at suitable locations to control the conditions existing therein and to permit the escape of excess air and carbon dioxide and other gases generated during the process of decomposition.

In the patents above referred to, the apparatus described comprises a digester in the form of a cylindrical drum mounted for rotation on an axis which is nearly, but not quite, horizontal. Raw waste organic material is fed into one end of the digester. Decomposition proceeds as the material moves lengthwise through the digester, and the finished fertilizer is withdrawn from the other end. The interior of the digester is divided into a series of compartments by a plurality of transverse partitions spaced along the axis of rotation in order that varying conditions required for the optimum propagation of the aerobic bacteria at each stage of decomposition may be maintained in the various compartments as decomposition proceeds. Means are provided to facilitate the transfer of the material from one compartment to the next as decomposition proceeds.

As also described in said patents, air is forced into the digester at the discharge end thereof, i.e. at the end through which finished fertilizer is withdrawn, and passages are provided through the partitions to allow air to move through the series of compartments. For reasons explained in said patents, it is also necessary to vent said compartments by providing valve controlled passages through the wall of the digester through which exess air and entrained gases generated by the process may be permitted to escape at controlled rates in order to maintain control over temperature and carbon dioxide concentrations as required.

In practice, because of the moist, somewhat sticky nature of the material, it has been found extremely difficult to prevent the decomposing organic material from obstructing such passage and valves, and sometimes blocking them completely. The resulting restriction or stoppage of flow of air through such passages is harmful to the operation of the process, for optimum results can be obtained only by close control of the flow through such passages. It has been necessary, therefore, to keep the passages under observation and to clear them from time to time when they become obstructed.

In the prior patents referred to it was proposed to shield such passages by the provision of a guard plate to cover the entrance to each passage, but in practice these have not been entirely satisfactory because the guard structures themselves have tended to clog up. Screens have been unsatisfactory for the same reason. The use of motor driven screw conveyors has also been proposed, but the complications of housings and mountings of such conveyors have been deemed prohibitive.

It is an object of the present invention to provide a very simple, inexpensive shield for such passages which has been found effective and reliable in practice.

Other objects and advantages of the invention will appear hereinafter.

A preferred embodiment of the invention selected for purposes of illustration is shown in the accompanying drawings, in which, FIG. 1 is a fragmentary view, in elevation, partly broken away, of a portion of the outside shell of a digester of the type shown and described in Pats Nos. 3,138,447 and 3,245,759.

FIG. 2 is a section on the line 2—2 of FIG. 1.

Referring to the drawings, the cylindrical wall 1 of the digester is provided with a valve housing 2 within which a valve of any suitable type may be mounted. The valve controls the passage 3 which extends through the wall 1 to the outside and opens into the interior of the digester within any one of the series of compartments as described in said patents. The valve controls the venting of that particular compartment. A transverse partition 4 separates the compartment 5 from the next adjacent compartment 6, and an aperture 7 in the partition permits the flow of air and gases from one compartment to the other.

A fixed baffle 8 is welded to the interior of the wall 1 on each side of the partition 4 adjacent the passage 3 and the aperture 7 along line 9 which is substantially parallel to the axis of rotation of the digester. These baffles extend inwardly from the wall in a plane which is inclined thereto. One end of each baffle is in abutting engagement with, and is preferably welded to, the partition 4, while the other free end of each baffle extends a substantial distance beyond the passage 3 and aperture 7. A second, movable baffle 10 is hinged to the wall 1 on each side of the partition 4 along a hinge line 11 which is parallel to line 9 but spaced circumferentially therefrom with said passage 3 and aperture 7 located between lines 9 and 11. The fixed baffles 8 and the hinged baffles 10 coopedate to form a protective cover for the passage 3 and the aperture 7, as hereinafter described, while the said passage and aperture are buried beneath the material as the digester rotates. The hinged baffles 10 are slightly wider than the fixed baffles so that they may overlap and rest on the edges of baffles 8 during certain portions of the rotation of the digester as hereinafter described. In that position the baffles 8 and 10, together with the wall of the digester form substantially a triangular shaped space which scrrounds the passage 3 and aperture 7.

In FIG. 2 of the drawings the baffles 8 and 10 and their respective passage 3 and apertures 7 are shown in three circumferentially spaced positions. Actually, a single set of these parts is sufficient for any single compartment of the digester, but three sets are shown in FIG. 2 to represent three different positions during the rotation of the digester and to simplify the description of the operation of the invention.

In the operation of such rotary digester, the drum is customarily filled to between 50% and 75% of its volumetric capacity, and it is rotated relatively slowly, preferably at between 15 and 45 revolutions per hour. Under these conditions it has been observed that as the digester rotates, the surface of the material being processed assumes an angle varying from about 40° to about 70° from the horizontal. In FIG. 2, it has been assumed that the digester has been filled with material 12 to approximately 50% of its volumetric capacity and that it is rotating in clockwise direction as indicated by the arrow. The surface of the material is shown to have assumed an angle of approximately 45° to the horizontal.

As shown in FIG. 2, at "Position A" the hinged baffle 10 has swung downwardly under the influence of gravity to rest against the free edge of the fixed baffle 8 so as to cover the passage 3 and the aperture 7. As rotation of the digester continues, these parts gradually become buried beneath the mass of material, but none can enter the triangular shaped space formed by the baffles except at the open ends thereof, but this is insufficient to prevent free flow of air through passage 3 or aperture 7. At "Position B," these parts are shown completely buried in the material, but even though additional rotation of the digester would normally tend to allow the hinged baffle to open, it remains closed due to the pressure of the surrounding material. At "Position C," however, as these parts emerge from the material, the hinged baffle 10 swings open to allow any material which may have entered the space to drop out.

It will be understood that the invention may be variously modified and embodied within the scope of the subjoined claims.

We claim as our invention:

1. In a rotary digester for the aerobic decomposition of waste organic materials comprising a drum mounted for rotation on a substantially horizontal axis and having a cylindrical outer wall and a plurality of internal transverse partitions dividing said drum into a series of compartments, each of said partitions having an aperture therein for passage of air and gases from one compartment to another, means to cover and protect said aperture and form a channel permitting flow of air and gases therethrough comprising a fixed baffle mounted on the interior of said cylindrical wall adjacent said aperture along a line substantially parallel to the axis of rotation of said drum, and a movable babffle hinged to the said cylindrical wall along a line which is parallel to said first line but spaced circumferentially therefrom with said aperture therebetween, said hinged baffle swinging into and out of engagement with said fixed baffle during rotation of said drum, said baffles each having one end abutting a partition and having its other end extending a substantial distance beyond said aperture, said baffles forming a triangular shaped channel when said hinged baffle is in engagement with said fixed baffle, which said channel is open ended at the ends of said baffles which are remote from said partition to permit flow of air in and gases through said channel to and through said aperture.

2. Apparatus according to claim 1 in which said cylindrical wall is provided with a valve controlled passage extending therethrough and opening into the interior of said drum adjacent said aperture and in which said baffles cover and protect both said aperture and said passage.

3. Apparatus according to claim 1 in which one of said fixed baffles and one of said movable baffles is mounted on said cylindrical wall on each side of a partition.

References Cited

UNITED STATES PATENTS

| 700,842 | 5/1902 | Smith | 34—148 X |
| 3,245,759 | 4/1966 | Eweson | 23—259.1 |

FOREIGN PATENTS

| 425,258 | 2/1926 | Germany. |
| 113,010 | 1/1945 | Sweden. |

JAMES H. TAYMAN, Jr., Primary Examiner

U.S. Cl. X.R.

23—286, 269; 34—134, 138, 140, 109; 195—144